B. H. CONNOR.
STANDS FOR FIRE-IRONS.
No. 192,618. Patented July 3, 1877.
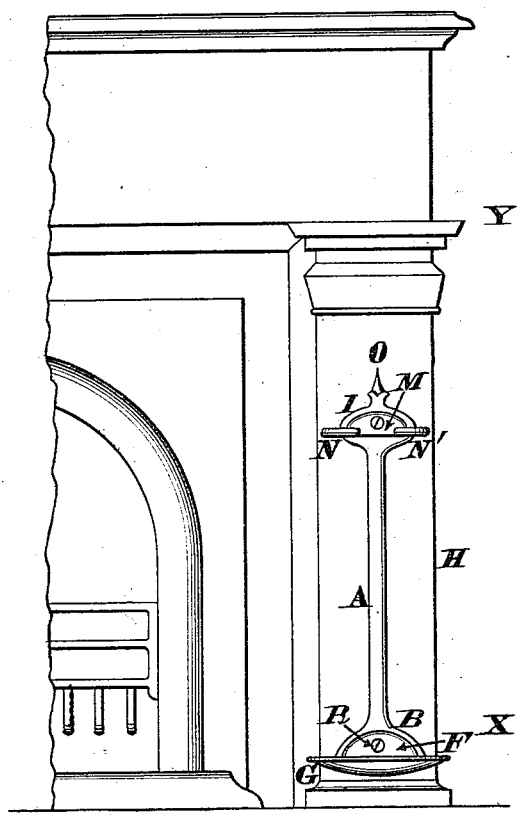
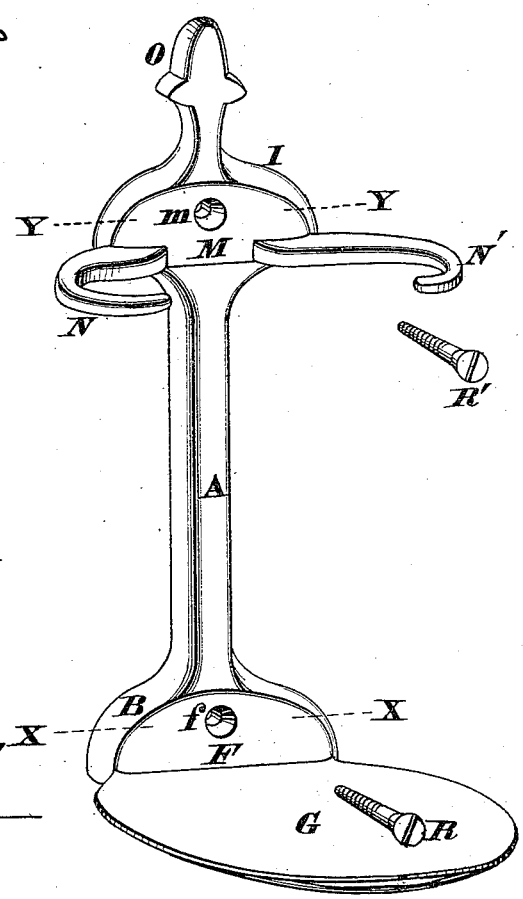
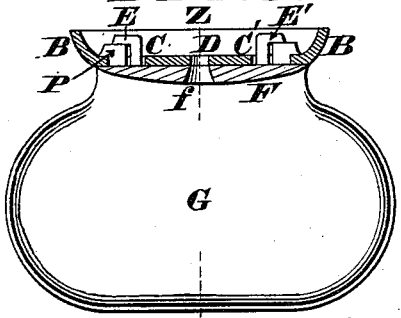
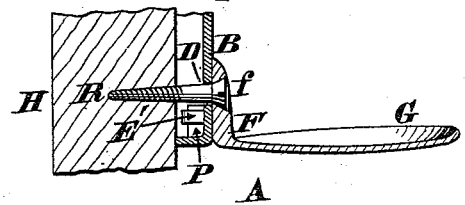
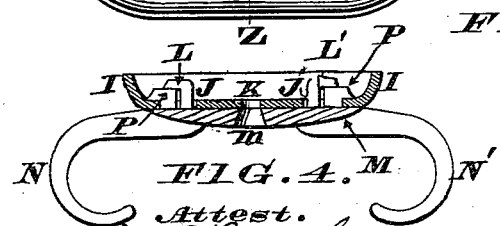
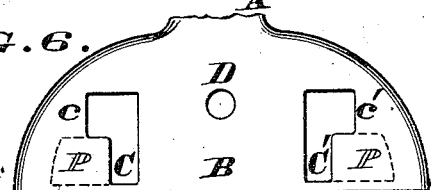

UNITED STATES PATENT OFFICE.

BENJAMIN H. CONNOR, OF CINCINNATI, OHIO.

IMPROVEMENT IN STANDS FOR FIRE-IRONS.

Specification forming part of Letters Patent No. 192,618, dated July 3, 1877; application filed March 16, 1876.

*To all whom it may concern:*

Be it known that I, BENJAMIN H. CONNOR, a resident of the city of Cincinnati, in the State of Ohio, have invented certain new and useful Improvements in Stands for Fire-Irons, of which the following is a specification:

My invention relates, in general, to a novel mode of making a sectional fire-iron stand, and consists, first, in constructing the stand in sections, and providing the same with interlocking devices, as hereinafter explained; second, in making the upright portion of the stand semi-tubular in form for the purposes hereinafter specified; third, in arranging the stand in such a manner that when the stand is intended to be fastened to the pilaster, &c., out of contact with the floor, the screws or nails employed will serve for securing said stand in any convenient position, and also prevent the several sections from being disconnected, as hereinafter more fully explained.

In the accompanying drawings, forming part of this specification, Figure 1 is an elevation, showing my stand attached to the pilaster of a mantel. Fig. 2 is a perspective view of the stand in condition for attachment. Fig. 3 is a transverse section of the same at the line X X. Fig. 4 is a transverse section of the same at the line Y Y. Fig. 5 is a vertical section at the line Z Z, showing the manner of attaching the bracket, and Fig. 6 is an enlarged elevation of the lower portion of the stand.

The principal member of the stand consists of a shaft or column, A, of any suitable shape and size, but preferably semi-tubular, so as to combine strength and lightness. The lower end of this shaft terminates in a base or enlargement, B, pierced with two vertical slots, C C', and an aperture, D. The slots C C' are, respectively, extended laterally at $c$ $c'$, to admit hooks E E', which project rearwardly from a plate, F, having the pan or basin G cast with or otherwise applied to it. The plate F has an aperture, $f$, which is in line with the opening D of the base B when the hooks E E' are engaged with the slots $c$ $c'$. (See Fig. 3.) These apertures are traversed by a screw, R, that serves to attach the base of the stand to the mantel-pilaster H, as represented in Figs. 1 and 5. The upper end of shaft A has a head, I, provided with slots J J', and an aperture, K, of the same character as the slots and apertures in base B. Applied to this head, by means of hooks L L', passing through the slots J J', is a plate, M, having two curved arms or hooks, N N', that sustain the upper portions of the fire-irons. Plate M is perforated at $m$ to receive the screw or nail R' that passes through both of the apertures K $m$, and thence into the pilaster of wall of the chimney. The head I may terminate with any suitable ornament, O. P are stumps, cast with the shaft A for the purpose of strengthening the metal in the immediate neighborhood of the slots C C' and J J'.

My stand is fitted together and then applied to the supporting column or wall in the following manner: The hooks E E' of plate F are first passed through the slots C $c$ C' $c'$, and engaged behind the stumps P, which simple act unites the pan G with base B. The hooks L L' are then passed through slots J J' and engaged behind stumps P, so as to couple the plate M and hooks N N' with the head I of the stand. These three united members are now located in their proper position upon the pilaster H, or else some other appropriate place, and the screws R R' are passed, respectively, through apertures D $f$ and K $m$, and engaged with said pilaster or other appropriate place. This acts prevents the separable sections from being disconnected, and also serves to secure the entire stand immovably to the wall, and when thus secured the pan G is elevated far enough to be out of the way of a person's feet. The stand being thus immovably secured in position, cannot be thrown down by a person coming in contact with it, neither does it occupy as much space as the portable ones do. On the approach of warm weather the screws R R' can be disengaged, the members or plates G M be detached from the shaft A, and the entire stand can then be stowed away in a very small space. This compact stowage of the stand is also an important advantage in shipping it.

The various sections can be ornamented to suit the demands of the market. It may be here remarked that the hooks E E' may be of any desired form, *i. e.*, of wedge or dovetail shape, &c., beveled on one or both sides. In such event the recesses to receive them will of course be correspondingly shaped to hold them securely in place.

When desired, the above-described stand may, with slight unessential modifications, be set upon the floor and take the place of the stands now in use.

What I claim as new, and desire to secure by Letters Patent, is—

1. The combination of base B C c C' c', pan F G, and hooks E E', as and for the object explained.

2. The combination-head I J J', plate M L L', and hooks N N', as herein described and illustrated.

3. A sectional fire-iron stand, whose pan F G and hooks M N N' are united to shaft A by interlocking devices, substantially as set forth, and are prevented from being unlocked by the screws or nails R R', which secure the stand to the pilaster or other appropriate place.

4. In a fire-stand for attachment to a pilaster or other appropriate place, the shaft A, made semi-tubular or concave at the back, to permit of sections G and M being locked to the shaft by means of hooks and lugs engaging within the concavity, substantially as and for the purposes set forth.

BENJ. H. CONNOR.

Attest:
D. P. KENNEDY,
CHARLES SCHAMMEL.